Oct. 21, 1924. 1,512,189
A. BALINGAO
SAFETY DEVICE FOR VEHICLES
Filed Jan. 15, 1924 2 Sheets-Sheet 1
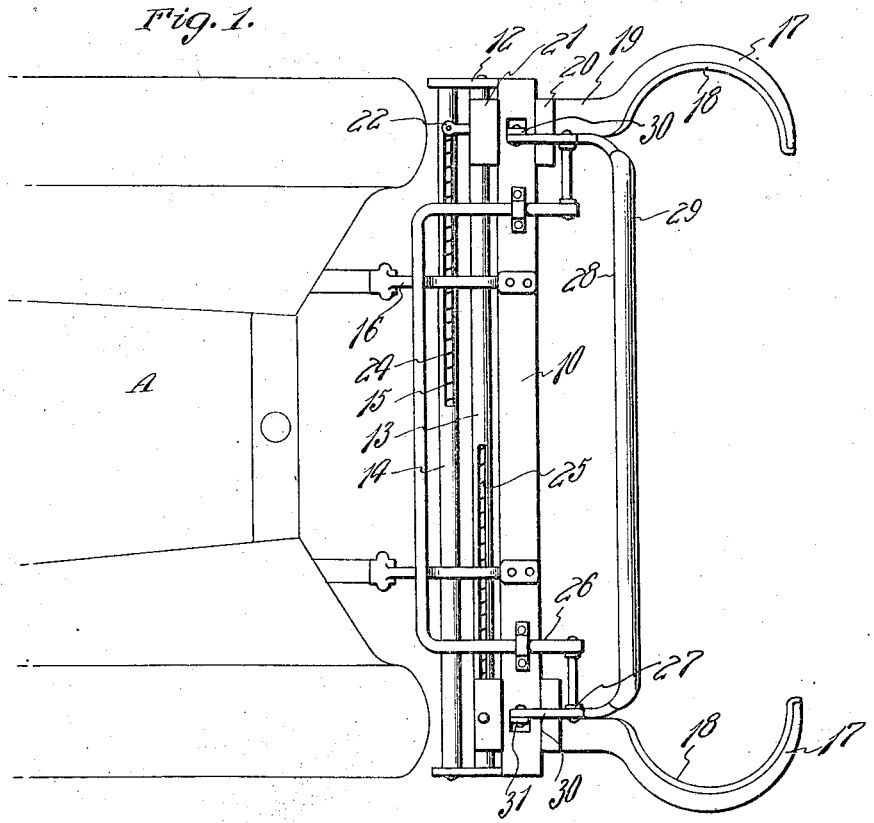
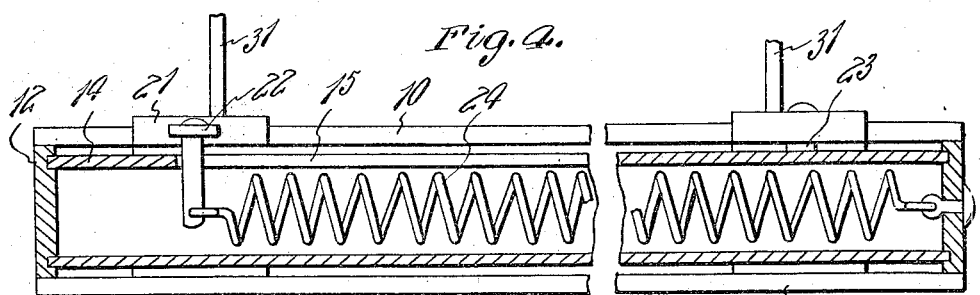
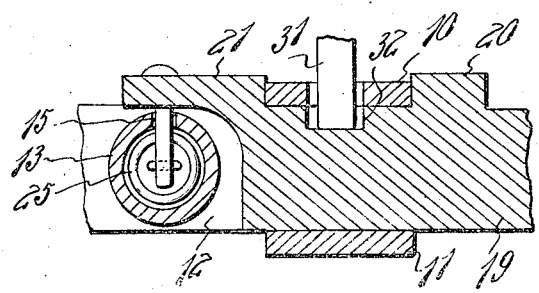
Alfredo Balingao
INVENTOR
BY Victor J. Evans
ATTORNEY

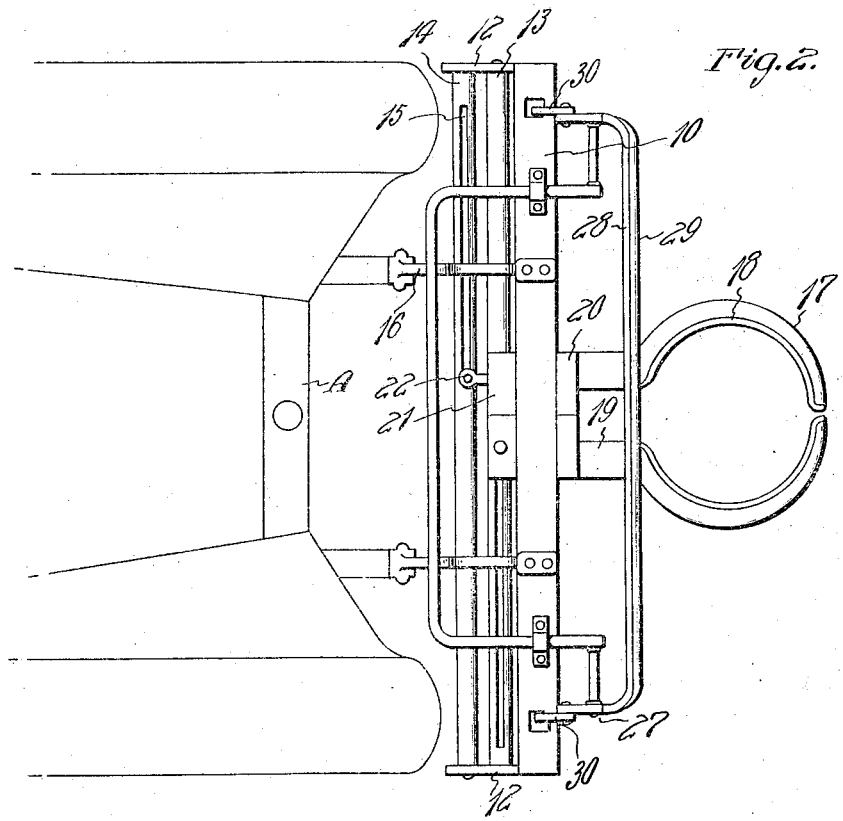
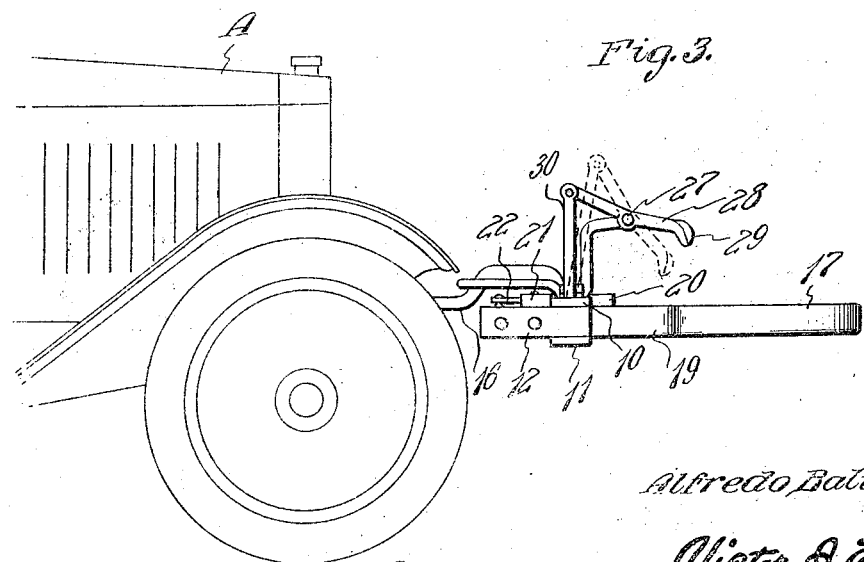

Patented Oct. 21, 1924.

1,512,189

UNITED STATES PATENT OFFICE.

ALFREDO BALINGAO, OF NATIVIDAD, PANGASINAN, PHILIPPINE ISLANDS.

SAFETY DEVICE FOR VEHICLES.

Application filed January 15, 1924. Serial No. 686,450.

*To all whom it may concern:*

Be it known that I, ALFREDO BALINGAO, a citizen of the Philippine Islands, residing at Natividad, Pangasinan, Philippine Islands, have invented new and useful Improvements in Safety Devices for Vehicles, of which the following is a specification.

This invention relates to safety device for use upon motor or other vehicles and has for its object the provision of a novel fender or bumper designed to be mounted upon the front of a vehicle and automatically operated to grip and hold the person struck by the vehicle so that the person cannot fall down and be run over, the device naturally acting as a preventer of injury from the reckless operation of vehicles.

An important and more specific object is the provision of a device of this character which is of a trap like nature and which is automatically operated by striking against a person, spring means being provided for effecting the gripping action.

An additional object is the provision of a device of this character which will be simple and inexpensive in manufacture and installation, easy to set, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a plan view of the device in set position and showing it applied to a vehicle, Figure 2 is a plan view showing the device sprung, Figure 3 is a side elevation showing the set position in full lines and the sprung position in dotted lines, Figure 4 is a detail longitudinal section on the line 4—4 of Figure 1, Figure 5 is a detail section taken across Figure 4 at the connection of one end of the spring therein.

Referring more particularly to the drawings the letter A designates the front portion of an automobile and it makes no particular difference as to the type, make or size of the vehicle as my attachment is capable of modification so as to be installed upon any car. In constructing the device I provide a frame construction which includes spaced upper and lower plates 10 and 11 connected by side bars 12. Secured to and extending between the side bars 12 are tubes 13 and 14 formed with slots 15. Secured to the uppermost plate 10 are rearwardly extending bars 16 which are secured to the vehicle frame by any desired means such as bolts, clamps or the equivalent.

In connection with this stationary supporting frame I provide a pair of hooks 17 which are curved toward each other as shown and which have their concaved sides covered with padding 18. These hooks are formed on shanks 19 which are engaged between the plates 10 and 11 and prevented from displacement laterally thereof by stops 20 and 21 engaging against the forward and rear edges of the plate 10. One stop 21 carries an arm 22 which extends into the slot 15 in the tube 14, while the other stop carries a bolt or finger 23 extending into the slot 15 in the tube 13. Within these tubes 13 and 14 are springs 24 and 25 respectively which engage against the fingers or arms 22 and 23 for normally urging the hooks 17 toward each other.

For holding the device in set position, I provide supporting brackets 26 which are mounted on the plate 10 and upon which is pivoted, at 27, a forwardly extending and downwardly inclined yoke 28 which has its front portion padded as shown at 29. Pivotally connected with the rear ends of the arms of this yoke are triggers 30 which extend through holes 31 in the plate 10 and which engage within recesses 32 in the shanks 19.

In the operation, it will be seen that to set the device ready for use, it is only necessary to pull the hooks 17 away from each other so that the recesses 23 in the shanks thereof will register with the openings 31 and receive the lower ends of the triggers 30. The parts will remain set until it happens that the vehicle runs into a person. When this occurs the impact of the person against the yoke 28 causes the same to be rocked downwardly which will result in elevation of the triggers 30 out of engagement with the recesses 32. The springs 24 and 25 then immediately operate to draw the hooks together and they will encirclingly engage and grip the body of the person struck and hold the person so that he cannot fall and be run over. Owing to the fact that the bumper or fender is of a resilient nature and padded and owing to the padding on the hooks it is apparent that the person will not be injured even though the vehicle be traveling at considerable speed.

From the foregoing description and a study of the drawings it will be apparent that I have thus provided a simply constructed, inexpensive and easily installed device which operates automatically after being set and which will be a great safeguard to the public for preventing injury when run down by vehicles.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A safety device of the character described comprising a stationary frame provided with means for attachment upon the front of a vehicle, a pair of hooks mounted upon the frame, spring means normally urging said hooks together, an impact released catch mechanism for holding said hooks in separated position, the hooks including shanks slidable along the frame, the shanks being formed with recesses adapted to register with openings in the frame, the catch means passing through said openings and engaging within said recesses.

2. A safety device of the character described comprising a stationary frame including spaced plates provided with means for attachment upon a vehicle, a pair of hooks having shanks slidable between said spaced plates, spring means normally urging said hooks together, a trigger mechanism for holding the hooks separated with the spring means under tension and a movably mounted bumper located between the hooks and connected with the trigger mechanism.

3. A device of the character described comprising a supporting frame including upper and lower plates provided with brackets for attachment upon a vehicle, a pair of hooks having shanks slidable between said plates, the upper plate being formed with openings and said shanks being formed with recesses adapted to register with the openings, a support carried by the upper plate, a bumper pivotally mounted upon said support, depending triggers carried by the bumper and passing through said openings with their lower ends engaged within said recesses, and spring means urging said shanks together.

4. A device of the character described comprising a supporting frame including upper and lower plates provided with brackets for attachment upon a vehicle, a pair of hooks having shanks slidable between said plates, the upper plate being formed with openings and said shanks being formed with recesses adapted to register with the openings, a support carried by the upper plate, a bumper pivotally mounted upon said support, depending triggers carried by the bumper and passing through said openings with their lower ends engaged within said recesses, spring means urging said shanks together, said means including a pair of slotted tubes containing coil springs, and arm members carried by said shanks and extending through the slots in the respective tubes and engaging said springs.

In testimony whereof I affix my signature.

ALFREDO BALINGAO.